US006983449B2

(12) United States Patent
Newman (10) Patent No.: US 6,983,449 B2
(45) Date of Patent: Jan. 3, 2006

(54) SYSTEM AND METHOD FOR CONFIGURING SOFTWARE FOR DISTRIBUTION

(75) Inventor: Patrick Newman, Jacksonville, FL (US)

(73) Assignee: Electronic Data Systems Corporation, Plano, TX (US)

( * ) Notice: Subject to any disclaimer, the term of this patent is extended or adjusted under 35 U.S.C. 154(b) by 434 days.

(21) Appl. No.: 10/099,331

(22) Filed: Mar. 15, 2002

(65) Prior Publication Data

US 2005/0144619 A1  Jun. 30, 2005

(51) Int. Cl.
 G06F 9/44  (2006.01)
(52) U.S. Cl. .................. 717/121; 717/103; 717/120; 717/122; 709/221
(58) Field of Classification Search ........ 717/172–178, 717/106–107, 121, 103, 120, 122; 709/221; 714/38; 703/27; 707/200, 203, 204; 715/500.1
See application file for complete search history.

(56) References Cited

U.S. PATENT DOCUMENTS

| 4,780,821 | A |   | 10/1988 | Crossley ............... 364/200 |
| 4,853,843 | A | * | 8/1989  | Ecklund ............... 707/203 |
| 4,951,192 | A |   | 8/1990  | Chase, Jr. et al. ......... 364/200 |
| 5,247,683 | A | * | 9/1993  | Holmes et al. ......... 709/221 |
| 5,263,164 | A |   | 11/1993 | Kannady et al. ........ 395/700 |
| 5,282,273 | A |   | 1/1994  | Ushio et al. ............ 395/325 |
| 5,339,435 | A |   | 8/1994  | Lubkin et al. .......... 717/121 |
| 5,581,764 | A |   | 12/1996 | Fitzgerald et al. ........ 395/703 |
| 5,678,041 | A |   | 10/1997 | Baker et al. ............. 707/9 |
| 5,857,072 | A |   | 1/1999  | Crowle .................. 709/203 |
| 5,867,714 | A | * | 2/1999  | Todd et al. ............ 717/172 |
| 5,909,581 | A |   | 6/1999  | Park .................... 717/170 |
| 5,919,247 | A |   | 7/1999  | Van Hoff et al. ......... 709/217 |
| 5,920,701 | A |   | 7/1999  | Miller et al. ........... 709/228 |
| 5,950,010 | A |   | 9/1999  | Hesse et al. ............ 717/178 |
| 6,085,188 | A |   | 7/2000  | Bachmann et al. ......... 707/3 |
| 6,119,122 | A |   | 9/2000  | Bunnell ................. 707/102 |
| 6,131,120 | A |   | 10/2000 | Reid .................... 709/225 |
| 6,138,153 | A |   | 10/2000 | Collins et al. .......... 709/211 |
| 6,195,794 | B1 |  | 2/2001  | Buxton ................. 717/108 |
| 6,205,579 | B1 |  | 3/2001  | Southgate .............. 707/203 |
| 6,226,784 | B1 |  | 5/2001  | Holmes et al. .......... 717/100 |
| 6,226,788 | B1 |  | 5/2001  | Schoening et al. ....... 717/107 |

(Continued)

FOREIGN PATENT DOCUMENTS

WO  WO 91/02313  2/1991

(Continued)

OTHER PUBLICATIONS

TITLE: A Multi-version Approach to Conflict Resolution in Distributed Groupware Systems, author: Sun et al, Apr. 2000, IEEE.*

(Continued)

*Primary Examiner*—Chameli C. Das
(74) *Attorney, Agent, or Firm*—Richard Mysliwiec (57) ABSTRACT

A method for distributing software is provided. The method includes configuring a first software system of a software suite, such as by installing it on a processor. A first set of configuration data associated with the first software system is then stored. A second software system of the software suite is then configured, and a second set of configuration data associated with the second software system is then stored. Conflict resolution rules are then applied to the first set of configuration data and the second set of configuration data. The first set of configuration data and the second set of configuration data are then compared to determine whether any conflicts exist, and the first set of configuration data and the second set of configuration data are assembled for installation on one or more processors if no conflicts exist.

14 Claims, 8 Drawing Sheets

U.S. PATENT DOCUMENTS

| | | | |
|---|---|---|---|
| 6,324,543 B1 * | 11/2001 | Cohen et al. | 707/200 |
| 6,347,312 B1 | 2/2002 | Byrne et al. | 707/3 |
| 6,367,077 B1 * | 4/2002 | Brodersen et al. | 717/170 |
| 6,397,378 B1 * | 5/2002 | Grey et al. | 717/175 |
| 6,405,364 B1 | 6/2002 | Bowman-Amuah | 717/101 |
| 6,418,554 B1 | 7/2002 | Delo et al. | 717/170 |
| 6,490,722 B1 * | 12/2002 | Barton et al. | 717/174 |
| 6,493,870 B1 | 12/2002 | Madany et al. | 717/165 |
| 6,564,369 B1 * | 5/2003 | Hove et al. | 717/121 |
| 6,615,166 B1 * | 9/2003 | Guheen et al. | 703/27 |
| 6,640,317 B1 * | 10/2003 | Snow | 714/38 |
| 6,651,248 B1 * | 11/2003 | Alpern | 717/162 |
| 6,687,731 B1 | 2/2004 | Kavak | 718/105 |
| 6,744,450 B1 * | 6/2004 | Zimniewicz et al. | 715/841 |
| 6,757,698 B2 * | 6/2004 | McBride et al. | 707/204 |
| 6,834,301 B1 | 12/2004 | Hanchett | 709/223 |
| 6,847,827 B2 | 1/2005 | Helm et al. | 455/509 |
| 2001/0034733 A1 | 10/2001 | Prompt et al. | 707/102 |
| 2001/0037339 A1 | 11/2001 | Harvey | 707/102 |
| 2002/0010700 A1 | 1/2002 | Wotring et al. | 707/100 |
| 2002/0113816 A1 | 8/2002 | Mitchell et al. | 345/734 |
| 2003/0009434 A1 | 1/2003 | Munn et al. | 707/1 |
| 2003/0055935 A1 | 3/2003 | Tarrant et al. | 709/223 |

FOREIGN PATENT DOCUMENTS

| | | |
|---|---|---|
| WO | WO 93/04426 | 3/1993 |

OTHER PUBLICATIONS

TITLE: Resolving conflicts with committing Transactions in Distributed Real-time Database, author: Lam et al, IEEE, 1997.*

TITLE: Concepts in Configuration Management Systems, author: Dart, ACM, 1991.*

TITLE: Managing Update Conflicts in Bayou, a Weakly Connected Replicated Storage system, author: Terry et al, ACM, 1995.*

Alexander, et al., System and Method for Integrating Software Management and Distribution, U.S. Pat. Appl. filed on Nov. 5, 1999, U.S. Pat. Appl. No. 09/435,300, pp. 1-45.

Richard S. Hall, Dennis Geimbigner, and Alexander L. Wolf, A Cooperative Approach to Support Software Deployment Using the Software Dock, Software Engineering Research Laboratory, University of Colorado, Software Engineering, 1999, pp. 1-10.

IBM Corporation, An Integrated Method for Installing Non-Integrated Software, IBM TDB Journal, Apr. 1998 [retrieved Mar. 21, 2002], retrieved from Software Patent Institute Database, pp. 1-9 (full text).

IBM Corporation, Internet Installation of Software Updates using a Web Browser, IBM TDB Journal, Nov. 1996 [retrieved Mar. 21, 2002], retrieved from Software Patent Institute Database, pp. 1-6 (full text).

InstallShield Software Corp. Ships InstallShield Express2.1, Business Wire, New York, Nov. 9, 1998 [retrieved Mar. 22, 2002], retrieved from ProQuest Data Base, pp. 1-4.

IEEE Spectrum, Apr. 1992, L. Brooks Hickerson et al., Managing Networked Workstations, pp. 55, 56, and 58.

ICL Technical Journal, vol. 7, No. 4, Nov. 1991, Oxford GB, XP000268112, P. Barthram et al., Distribution Management - ICL's Open Approach, pp. 702-717.

ICL Technical Journal, vol. 7, No. 4, Nov. 1991, Oxford, GB, XP000268110, T. Gale, The Evolution Within ICL of an Architecture for Systems Management, pp. 673, 685.

IBM Technical Disclosure Bulletin, vol. 32, No. 10A, Mar. 1990, Armonk, US, Reference Monitor- Location of Resource Access, p. 335.

1998 IEEE, Carl W. Symborski, Updating Software and Configuration Data in a Distributed Communications Network, pp. 331-337.

Shi et al., An enterprise directory solution with DB2, 2000, IBM Systems Journal, vol. 39, No. 2, pp. 360-383.

* cited by examiner

SYSTEM AND METHOD FOR CONFIGURING SOFTWARE FOR DISTRIBUTION

RELATED APPLICATIONS

This application is related to U.S. patent application Ser. No. 09/435,300, entitled "System and Method for Integrating Software Management and Distribution," filed Nov. 5, 1999.

FIELD OF THE INVENTION

The present invention pertains to the field of software distribution. More specifically, the invention relates to a system and method for configuring software for distribution that identifies conflicts between two or more components in a software suite and resolves the conflicts before distributing the software.

BACKGROUND OF THE INVENTION

Systems for enterprise software distribution are known in the art. For example, it is known to prepackage software for distribution over an existing enterprise network, such as a local area network, a wide area network, or a combination of such networks. The prepackaged software is then installed on one or more preselected workstations, such as by using a point-to-point message protocol, a broadcast protocol, or a publish and subscribe message protocol.

Many problems have been encountered with such software distribution schemes. One problem is that prepackaging of software usually includes installing two or more software systems on a processor, correcting any problems, and then storing the configuration of the software applications for distribution. Identification of problems is usually performed by operator testing, such that if an operator does not discover a problem during testing, the problem will be present on all nodes that receive the distribution package. This process results in many problems in enterprises having a large number of nodes, where the nodes differ significantly in the types of hardware and software available at each node. Operators must then manually correct problems at each node, resulting in additional expenses for such operators and lost productivity at each node.

SUMMARY OF THE INVENTION

In accordance with the present invention, a system and method for configuring software for distribution are provided that overcome known problems with systems and methods for configuring software for distribution.

In particular, a system and method for configuring software for distribution are provided that process components of software suites to identify conflicts prior to assembly of the components into software suites.

In accordance with an exemplary embodiment of the present invention, a method for distributing software is provided. The method includes configuring a first software system of a software suite, such as by installing it on a processor. A first set of configuration data associated with the first software system is then stored. A second software system of the software suite is then configured, and a second set of configuration data associated with the second software system is then stored. Conflict resolution rules are then applied to the first set of configuration data and the second set of configuration data. The first set of configuration data and the second set of configuration data are then compared to determine whether any conflicts exist, and the first set of configuration data and the second set of configuration data are assembled for installation on one or more processors if no conflicts exist.

The present invention provides many important technical advantages. One important technical advantage of the present invention is a system and method for configuring software for distribution that identifies files, settings, and dependencies for each software component in a suite and determines whether any conflicts exist for such files, settings, and dependencies prior to the assembly of the components into a software suite. Rules can thus be created for resolving such conflicts, which prevents inadvertent failure to correct problems, such as by failing to identify the problem through operator testing.

Those skilled in the art will further appreciate the advantages and superior features of the invention together with other important aspects thereof on reading the detailed description that follows in conjunction with the drawings.

DETAILED DESCRIPTION OF THE INVENTION

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
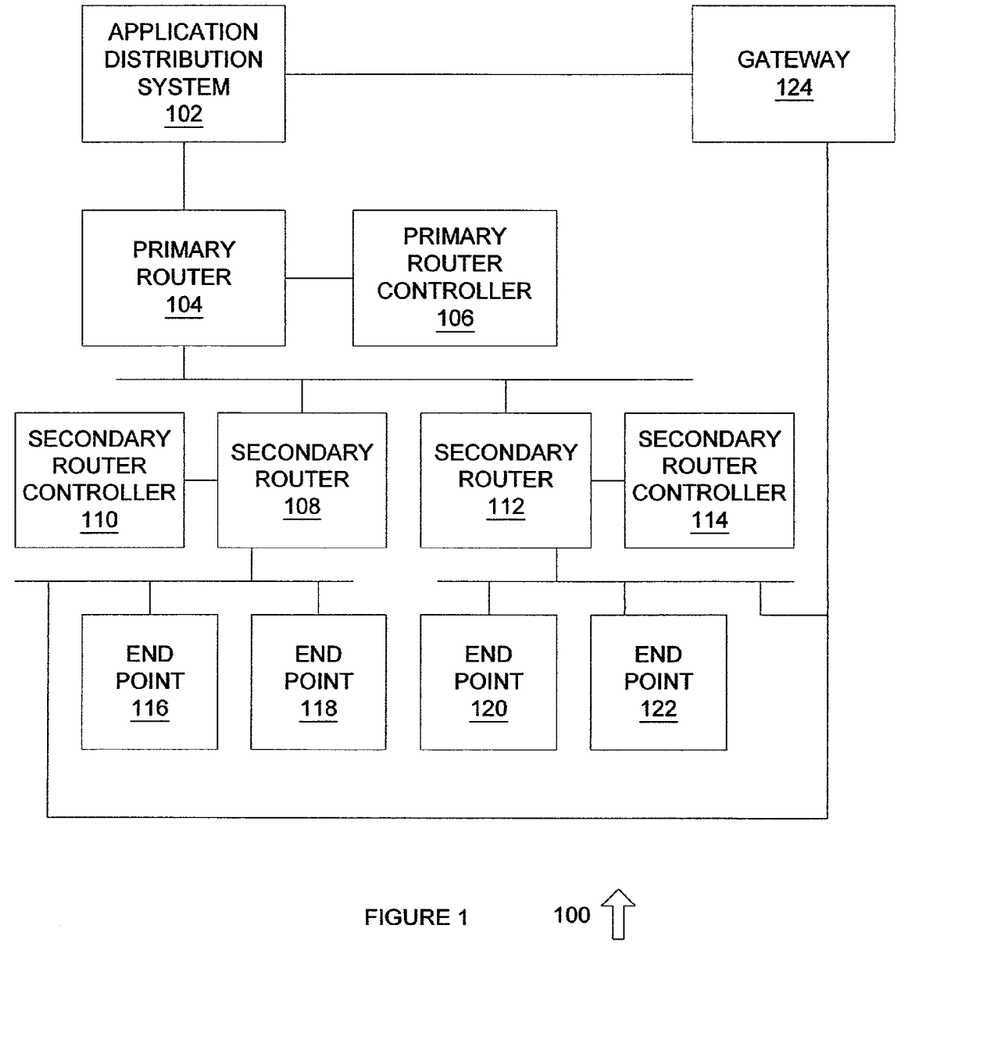
FIG. 1 is a diagram of a system for distributing software in accordance with an exemplary embodiment of the present invention.

FIG. 1 is a diagram of a system 100 for distributing software in accordance with an exemplary embodiment of the present invention. System 100 can be used to efficiently distribute software in a very large enterprise, such as to thousands of geographically distributed workstations or nodes from a single distribution point.

System 100 includes application distribution system 102, which can be implemented in hardware, software, or a suitable combination of hardware and software, and which can be one or more software systems operating on a general purpose server platform. As used herein, a software system can include one or more objects, agents, lines of code, threads, subroutines, databases, application programming interfaces (APIs), web browser plug-ins, or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Application distribution system 102 is used to distribute packages of software that have been assembled for installation on an endpoint, such as using an assembly system and method described in U.S. patent application Ser. No. 09/435,300, entitled "System and Method for Integrating Software Management and Distribution," filed Nov. 5, 1999, which is hereby incorporated by reference for all purposes. An endpoint can be a suitable processor platform, such as a laptop computer, a desktop computer, a workstation, a handheld device, a peripheral component such as a scanner, a printer, a copy machine, a fax machine or other suitable systems having a processor and processing capabilities.

Application distribution system 102 is coupled to primary router 104. As used herein, the term "couple," and its cognate terms such as "couples" and "coupled," can include a physical connection (such as through a copper conductor), a virtual connection (such as through randomly assigned memory locations of a data memory device), a logical connection (such as through one or more logical devices of a semiconducting circuit), a hypertext transfer protocol connection, other suitable connections, or a suitable combination of such connections. In one exemplary embodiment, systems and components are coupled to other systems and components through intervening systems and components, such as through an operating system of a general purpose server platform.

Application distribution system 102 provides files to primary router 104 for distribution to a plurality of endpoints. Application distribution system 102 coordinates the transmission of files used for configuring the software applications so that the distribution of the software applications to the endpoints is optimized. Primary router 104 is used to distribute the files as a plurality of messages in a modified publish and subscribe format, where the address for each message is assigned by application distribution system 102 based on the location of the endpoints.

Primary router 104 can be implemented in hardware, software, or a suitable combination of hardware and software, and can be one or more software systems operating on a general purpose server platform. Primary router 104 is an application layer router, as opposed to a hardware layer router. In one exemplary embodiment, in the Open Systems Interconnection (OSI)networking model, an application layer router would operate in layer 7 of the OSI model, whereas a physical layer router would operate in layer 1 of the OSI model. Thus, primary router 104 can operate on a suitable network node that is normally not used for software distribution, such as a server, a workstation, or other suitable processing platforms. In this manner, primary router 104 can be selected based on an optimal network architecture, as opposed to using an existing hardware layer router that may not be optimally located for distribution of software in an enterprise.

Primary router controller 106 is coupled to primary router 104, and performs control of primary router 104. In one exemplary embodiment, primary router controller 106 can be implemented in hardware, software, or a suitable combination of hardware and software, and can be one or more software systems operating on a general purpose server platform. Primary router controller 106 receives messages from primary router 104 and stores the messages for subsequent transmission to other nodes in the distribution system. In one exemplary embodiment, primary router controller 106 stores messages that include one or more files, and then provides the messages to primary router 104 for transmission at predetermined times, upon the occurrence of predetermined events, or in other suitable manners. The processor resources of primary router 104 can thus be optimized, so as to facilitate rapid distribution of software throughout the enterprise from a centralized location.

Primary router 104 is coupled to secondary router 108 and secondary router 112, such as through a network. Secondary router 108, secondary router 112, secondary router controller 110 and secondary router controller 114 can each be implemented in a manner similar or identical to that of primary router 104 and primary router controller 106, respectively. Secondary router 108 and secondary router 112 receive messages containing files for distribution to endpoints from primary router 104. The messages are addressed and distributed in a modified publish and subscribe process that uses the connection between secondary router 108 and primary router 104 as a first channel, and the connection between secondary router 112 and primary router 104 as a second channel. In this manner, primary router 104 distributes messages to secondary router 108 and secondary router 112 by posting those messages to the corresponding channel. Thus, files to be distributed through primary router 104 and secondary router 108 and secondary router 112 can be addressed using a conventional publish and subscribe process where the message is addressed by identifying the channel to which the message should be routed, but where the "subscription" process is performed using standard network messaging functions.

Secondary router controller 110 and secondary router controller 114 are used to store and process the messages and files as they are received, so that the messages and files can then be routed through secondary router 108 and secondary router 112, respectively, in accordance with router processor capacity, bandwidth of the communications media, at predetermined times, in response to predetermined events, or based on other suitable criteria.

Secondary router 108 is coupled to endpoint 116 and endpoint 118, and secondary router 112 is coupled to endpoint 120 and endpoint 122, such as by a single network connection, two network connections as shown, or other suitable communications media. Files are transmitted in the form of messages from secondary router 108 to endpoints 116 and 118, and from secondary router 112 to endpoints 120 and 122, such as upon receipt of notification of a predetermined event, after the expiration of a period of time, or in accordance with other suitable routing commands. In addition, the addressing of messages from secondary router 108 to endpoint 116 and endpoint 118 is performed by using a modified publish and subscribe message format. In this manner, application distribution system 102 can address files for distribution to endpoints 116 through 122 by identifying the first channel to secondary router 108 or secondary router 112, and the second channel to the endpoint, where the existing network messaging software is used to install the files on the endpoints from the secondary routers. Thus, system 100 uses a modified publish and subscribe message format to distribute software in an enterprise, so as to deploy software systems on a large number of endpoints. System 100 allows the transmission of large numbers and sizes of files over application layer routers and communications media that does not overload the processor capabilities of the routers, and that does not overload the bandwidth of the communications media. In this manner, application distribution system 102 can sequence the distribution of files in a manner that optimizes the existing system architecture.

Gateway 124 can be implemented in hardware, software, or a suitable combination of hardware and software, can be one or more software systems operating on a general purpose server platform. In one exemplary embodiment, gateway 124 is an existing server node in a network that is used as an application layer gateway for the purpose of facilitating enterprise software distribution. The enterprise software distribution process may require response messages to be generated by endpoints 116 through 122 and transmitted back to application distribution system 102 or other suitable systems. Gateway 124 can be used to return messages in response to event notification messages or other data transmitted through primary router 104 to secondary routers 108 or 112 so as to trigger subsequent transmission of messages to endpoints 116 and 122. Gateway 124 is coupled to endpoints 116 through 122, such as through the network connection between secondary routers 108 and secondary router 112, or by other suitable means. Thus, gateway 124 can be used to receive and coordinate message transmissions from endpoints 116 through 122 to application distribution system 102 or other suitable systems.

In operation, system 100 can be used to distribute software in an enterprise that includes a large number of nodes in geographically dispersed areas. System 100 allows software to be transmitted to each node using modified publish and subscribe messaging that uses existing network communications systems and allows file transmission to be coordinated through timing or in response to events, and to optimize the use of application layer router processing capabilities and bandwidth of network connections. In this manner, application distribution system 102 can determine an optimal processor and bandwidth loading based on the distribution of software to endpoints, and can further address files for distribution to endpoints in a manner that does not require those files to be individually addressed, broadcast, or that does not require the endpoints to determine the files that are needed and to subscribe to channels to receive such files. In this manner, application distribution system 102 can provide a sequence of file distribution based on optimized routing practices, such as by transmitting messages to endpoints to determine configuration information and then sequencing specific software to endpoints based on geographical, functional, or other parameters and network bandwidth and resources.

Figure 2:
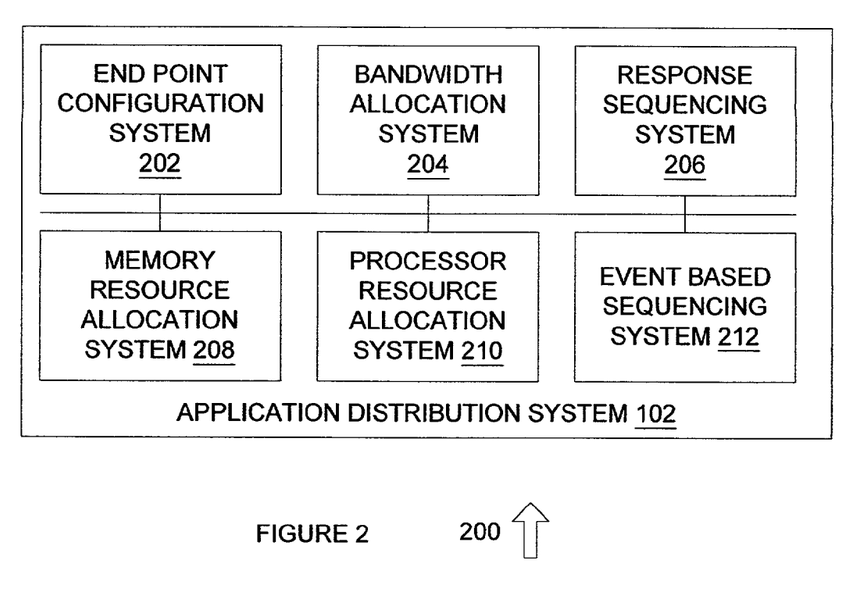
FIG. 2 is a diagram of a system for distributing applications in an enterprise in accordance with an exemplary embodiment of the present invention.

FIG. 2 is a diagram of a system 200 for distributing applications in an enterprise in accordance with an exemplary embodiment of the present invention. System 200 includes application distribution system 102 and endpoint configuration system 202, bandwidth allocation system 204, response sequencing system 206, memory resource allocation system 208, processor resource allocation system 210 and event based sequencing system 212, each of which can be implemented in hardware, software, or a suitable combination of hardware and software, and which can be one or more software systems operating on a general purpose server platform.

Endpoint configuration system 202 includes endpoint configuration data for a plurality of endpoints in an enterprise. In one exemplary embodiment, endpoint configuration system 202 can include a database of processor configuration data that identifies the location of each processor, the applications that are required for each processor, the groups to which the processor operators are assigned, processors having multiple operators, and other suitable information. This processor configuration data is used by endpoint configuration system 202 to identify software that should be transmitted to each endpoint in an enterprise software distribution event.

Bandwidth allocation system 204 receives message routing data and provides bandwidth allocation data in response to the message routing data. In one exemplary embodiment, bandwidth allocation system 204 tracks bandwidth availability for a software distribution path based on message routing data, such as by using modified publish and subscribe routing in which each channel that is required to transmit a message to an endpoint is contained in the address for the message, in addition to the total number of endpoints that will be receiving the message. Bandwidth allocation system 204 can generate bandwidth availability data, such as in response to a query from application distribution system 102 or other suitable systems, so as to allow such other systems to sequence messages accordingly. Likewise, bandwidth allocation system 204 can receive message data that includes priority data, and can sequence the messages based upon available bandwidth and message routing data contained in the modified publish and subscribe format.

Response sequencing system 206 receives message routing data and provides response sequencing data in response to the message routing data. In one exemplary embodiment, response sequencing system 206 tracks bandwidth availability for a response message path based on message routing data, such as by determining the maximum response message load that can be generated when a plurality of endpoints generate a response to a transmitted message. Response sequencing system 206 can determine bandwidth availability or processor capacity data, and can provide a time, event, or priority ranking for transmitted messages to ensure that the response messages can be transmitted to the required destination.

Memory resource allocation system 208 receives message routing data and provides memory resource allocation data in response to the message routing data. In one exemplary embodiment, memory resource allocation system 208 tracks memory resource availability for a software distribution path based on message routing data, such as using modified publish and subscribe routing in which messages need to be stored at application routers in response to bandwidth availability or other variables. Memory resource allocation system 208 can generate memory resource availability data, such as in response to a query from application distribution system 102 or other suitable systems, so as to allow such other systems to sequence messages accordingly. Likewise, memory resource allocation system 208 can receive message data that includes priority data, and can sequence the messages based upon available memory resources and message routing data contained in the modified publish and subscribe format.

Processor resource allocation system 210 receives message routing data and provides processor resource allocation data in response to the message routing data. In one exemplary embodiment, processor resource allocation system 210 tracks processor resource availability for a software distribution path based on message routing data, such as using modified publish and subscribe routing in which each channel required to transmit a message to an endpoint is contained in the address for the message, in addition to the total number of endpoints that will be receiving the message. Processor resource allocation system 210 can generate processor resource availability data, such as in response to a query from application distribution system 102 or other suitable systems, so as to allow such other systems to sequence messages accordingly. Likewise, processor resource allocation system 210 can receive message data that includes priority data, and can sequence the messages based upon available processor resources and message routing data contained in a modified publish and subscribe format.

Event based sequencing system 212 generates event based sequencing control data for inclusion in a message. In one exemplary embodiment, event based sequencing system 212 can determine whether the occurrence of an event is required prior to transmitting a message. For example, receipt of a "WakeOnLAN" message may be required before files are transmitted, or receipt of a first file may be required prior to transmission of a second file. Event based sequencing system 212 can include event confirmation control data that requires receipt of confirmation data from application distribution system 102, nodes, or other system components before transmitting a message. Likewise, event based sequence system 212 can receive event notification from systems operating on a router or router controller, such as timer systems, bandwidth availability monitors, processor loading monitors or other suitable systems.

In operation, system 200 allows files to be organized as messages, and messages to be sequenced for distribution to a plurality of processors in an enterprise. System 200 allows the distribution of files to be organized so that files are transmitted in accordance with optimal bandwidth allocation, optimal memory resource allocation, optimal processor resource allocation, optimal response sequencing allocation for response gateways or other response systems, and optimal event based sequencing. System 200 thus allows files to be sequenced so as to facilitate file distribution in an optimal time period.

Figure 3:
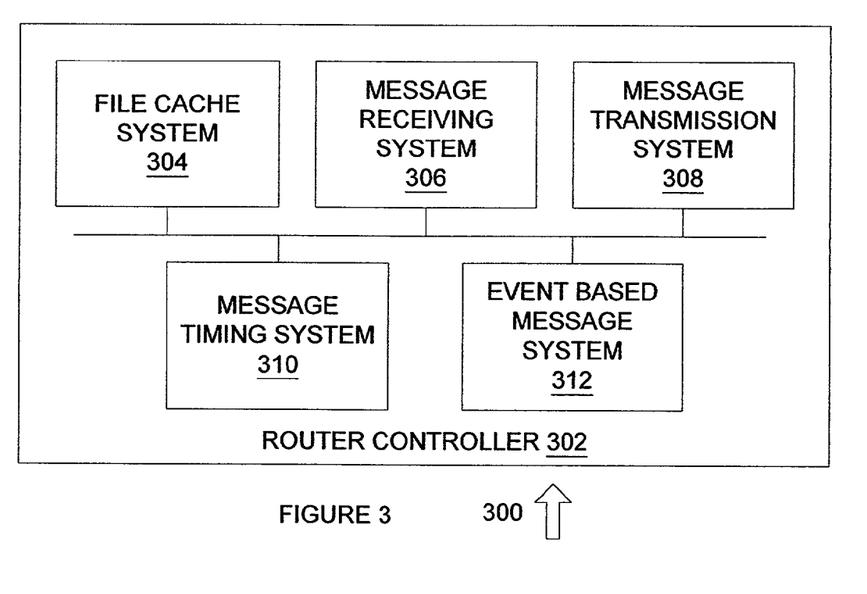
FIG. 3 is a diagram of a system for controlling an application layer router in accordance with an exemplary embodiment of the present invention.

FIG. 3 is a diagram of a system 300 for controlling an application layer router in accordance with an exemplary embodiment of the present invention. System 300 includes router controller 302 and file cache system 304, message receiving system 306, message transmission system 308, message timing system 310 and event based message system 312, each of which can be implemented in hardware, software, or a suitable combination of hardware and software, and which can be one or more software systems operating on a general purpose server platform.

File cache system 304 receives messages, including one or more files, and stores the messages for subsequent transmission to one or more endpoints. File cache system 304 can store the messages in a random access memory, a magnetic storage media, or other suitable storage media based on the expected amount of time that a given file will be stored. In one exemplary embodiment, file cache system 304 can determine whether a file will be stored for a predetermined amount of time or until an event occurs, and can store the file in a storage medium based upon the expected amount of storage time for the file.

Message receiving system 306 receives messages including routing data, such as publish and subscribe distribution data, and payload data that can include files for distribution and corresponding control data, event messages that are used to trigger event based message distribution (such as timing messages, processor availability messages, bandwidth availability messages, or other suitable messages), and other suitable payload data. Message receiving system 306 then performs a message preparation function on the message. In one exemplary embodiment, a message preparation function can include extracting payload data for processing by message timing system 310, event based message system 312, or other suitable systems, preparing the message for retransmission to another router through message transmission system 308, or other suitable message preparation functions.

Message transmission system 308 assembles address data and payload data into a message for transmission by a router. In one exemplary embodiment, the message transmission system 308 can assemble files into payload data and append publish and subscribe address data based on control data received from message timing system 310, event based message system 312, message receiving system 306, or other suitable systems. In another exemplary embodiment, message transmission system 308 can transmit data to another router or router controller, such as bandwidth availability data, processor capacity data or other suitable messages.

Message timing system 310 performs timing functions for distribution of messages. Message timing system 310 can sequence messages in accordance with timing control data associated with each message, can start one or more timers based on receipt of messages with associated timer control data, and can perform other suitable functions.

Event based message system 312 tracks messages with event based transmission functions and generates message transmission control data upon the occurrence of an event. In one exemplary embodiment, event based message system 312 can store a list or other suitable structures with the events, and can monitor event messaging to determine whether an event has occurred. In another exemplary embodiment, event based message system 312 can perform queries or other suitable functions to determine whether an event has occurred. Event based message system 312 can further compile files and other data into a message to be transmitted upon the occurrence of an event.

In operation, system 300 provides control for an application layer router in a software distribution system for an enterprise. System 300 allows modified publish and subscribe messaging to be used to distribute messages in an enterprise software distribution system, in which messages are published based upon priority, time, bandwidth capacity, processor capacity, events, or other occurrences. System 300 thus allows the existing network to be used in an enterprise to distribute software to a plurality of endpoints in a manner that optimizes the software distribution process.

Figure 4:
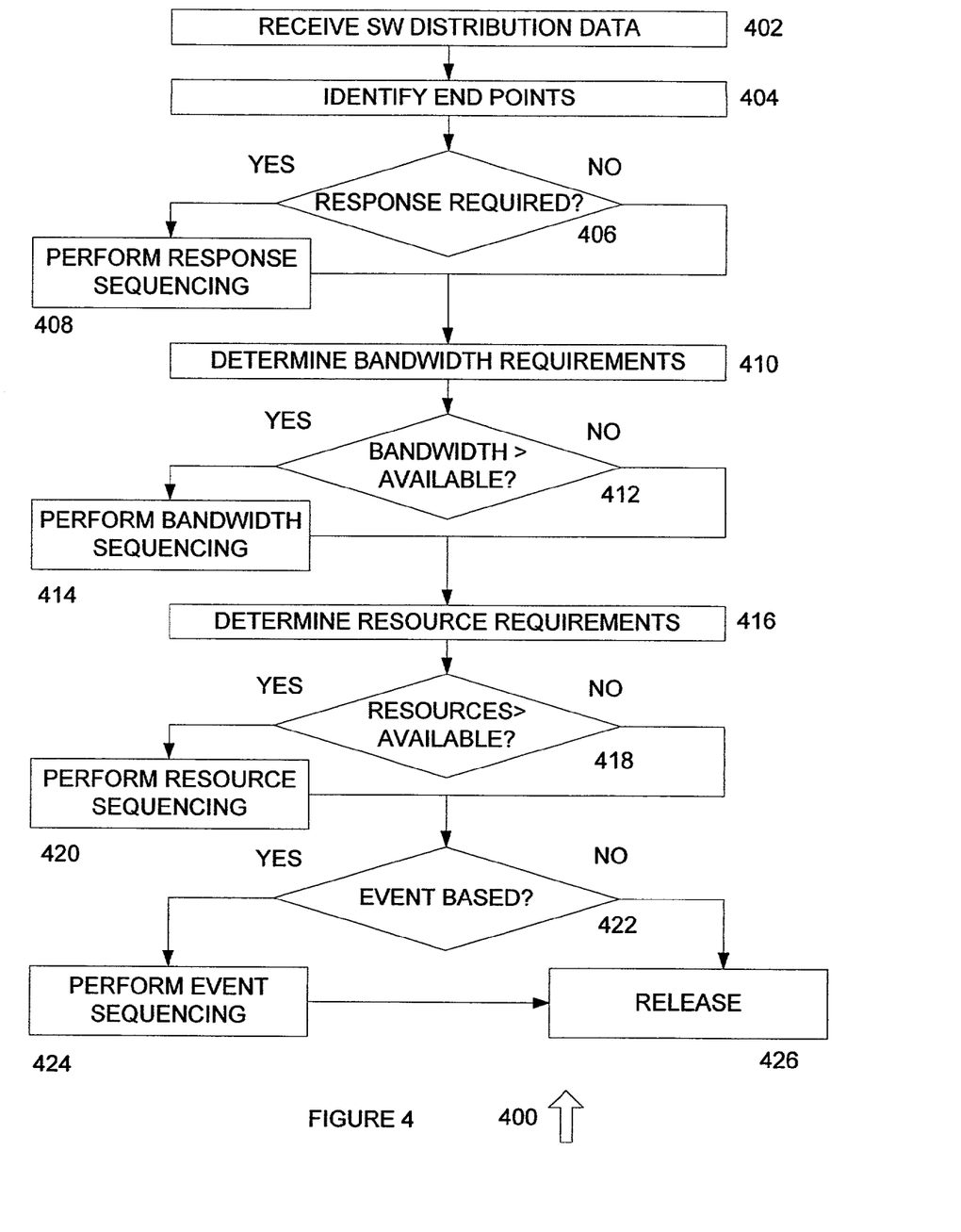
FIG. 4 is a flowchart of a method for distributing software using modified publish and subscribe messaging, in accordance with an exemplary embodiment of the present invention.

FIG. 4 is a flowchart of a method 400 for distributing software using modified publish and subscribe messaging, in accordance with an exemplary embodiment of the present invention. Method 400 allows messages to be sequenced based upon resources, bandwidth, responses, events, or other suitable criteria.

Method 400 begins at 402, where software distribution data is received. In one exemplary embodiment, the software distribution data can include data identifying suites of software to be distributed, where the suites further comprise a plurality of software components, where each component includes a plurality of files. Likewise, the software distribution data can identify classes of machines that should receive different software suites and components based upon the function of the node, the location of a node, the geographic location of a node, the location of a node within an organization, or other suitable functions. The method then proceeds to 404.

At 404, the endpoints associated with the software distribution data are identified. In one exemplary embodiment, endpoints can be classed based upon various geographical data, organizational data, functional data, or other suitable data, where the network address for the endpoint is correlated based on these various factors. After the endpoints are identified, the method proceeds to 406.

At 406, it is determined whether a response is required to the message. In one exemplary embodiment, a message can include a control command that causes the processor to perform a function, such as activating an Intel WakeOnLAN Network Interface Card that causes a computer that is off to activate, an inventory scan function that causes the computer to transmit a list of files stored on the computer, a heartbeat query that causes a computer to respond if it is active, or other suitable responses. If it is determined at 406 that a response is not required, the method proceeds to 410. Otherwise, the method proceeds to 408 where a response to sequencing is performed. In one exemplary embodiment, the response to sequencing can include an analysis of the priority in which responses should be received, the bandwidth available between endpoints that will be receiving the response message and the application requiring the response, such as an application distribution system 102, the processing capacity of an application layer gateway or other suitable systems that are used to coordinate transmission of responses to the application, and other suitable constraints or factors. The method then proceeds to 410.

At 410, the bandwidth requirements for the messages are determined. In one exemplary embodiment, bandwidth requirements can be based on total bandwidth required for a group of messages, the bandwidth required at various points and the message transmission path to endpoints, or other suitable bandwidth requirements. The method then proceeds to 412.

At 412, it is determined whether the amount of bandwidth required is greater than available bandwidth. If the amount of bandwidth required is not greater than available, the method proceeds to 416. Otherwise, the method proceeds to 414 where bandwidth sequencing is performed. In one exemplary embodiment, bandwidth sequencing can be performed by using the priority of messages, the priority of endpoints, can be based on an analysis of bottleneck constraints, such as areas in which the bandwidth is a constraint on distribution for other areas, or other suitable factors. The method then proceeds to 416.

At 416, resource requirements are determined for distribution of the messages throughout the enterprise. In one exemplary embodiment, resource requirements can include the processor requirements for receiving and transmitting messages, storing messages, bandwidth requirements, or other suitable resource requirements. The method then proceeds to 418.

At 418, it is determined whether the amount of resources required for distribution of the messages exceeds available resources. If the amount does not exceed available resources, the method proceeds to 422. Otherwise, the method proceeds to 420 where resource sequencing is performed. In one exemplary embodiment, resource sequencing can include ordering messages based upon the priority of the message, based upon the amount of resources required, based upon bottleneck resource constraints, such as areas in which the processor capacity or storage availability will limit the distribution of the messages or other suitable resource sequencing. The method then proceeds to 422.

At 422, it is determined whether any event based messages are included. If no event based messages are included, the method proceeds to 426 and terminates. Otherwise the method proceeds to 424 where event based sequencing is performed. In one exemplary embodiment, events can be sequenced based upon priority of the event, a sequence number for events, or other suitable data. The method then proceeds to 426 where the message sequencing is released.

In operation, method 400 allows a plurality of messages including file messages and control data messages to be sequenced so as to allow enterprise distribution of software to be performed over a network. Method 400 uses existing network resources to distribute software from one or more centralized locations to a plurality of endpoints in an efficient manner, so as to optimize available network resources to allow the software to be efficiently distributed.

Figure 5:
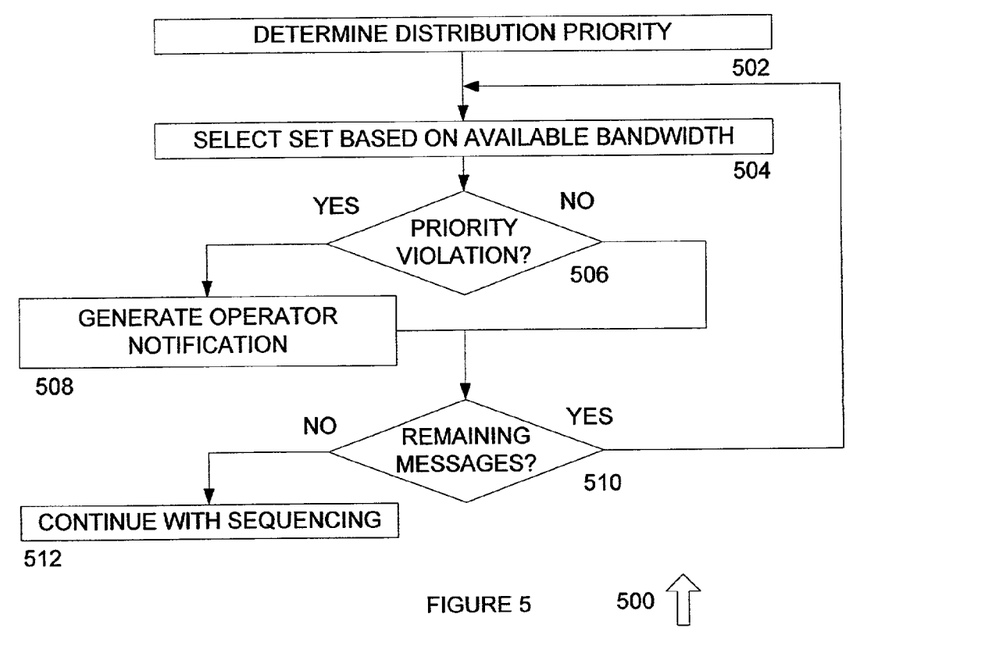
FIG. 5 is a flowchart of a method for performing bandwidth sequencing of messages in accordance with an exemplary embodiment of the present invention.

FIG. 5 is a flowchart of a method 500 for performing bandwidth sequencing of messages in accordance with an exemplary embodiment of the present invention. Method 500 allows a plurality of messages to be sequenced based upon bandwidth requirements in an enterprise software distribution system.

Method 500 begins at 502 where distribution priority is determined. In one exemplary embodiment, distribution priority can be determined based upon the software suite, the software component of a suite, the location of an endpoint, the function of an endpoint, a function that has to be performed by the endpoint, a function that has to be performed by an application layer router or gateway, or other suitable criteria. The method then proceeds to 504.

At 504, a message set is selected based upon the available bandwidth. In one exemplary embodiment, the message set can be selected by taking the highest priority messages in sequence until all available bandwidth has been allocated. In another exemplary embodiment, the message set can be selected based on priority in conjunction with other factors, such as the location of associated endpoints with priority messaging, bandwidth bottlenecks at certain locations, or other suitable functions. The method then proceeds to 506.

At 506, it is determined whether a priority violation has occurred. In one exemplary embodiment, a priority violation can include a sequencing of messages that results in a message not being transmitted at a required time, such as prior to transmission of other messages, in conjunction with transmission of other messages, or at other suitable times. If a priority violation has not occurred, the method proceeds to 510. Otherwise the method proceeds to 508 where operator notification is generated. In one exemplary embodiment, operator notification can request that the operator correct the priority violation, such as by reviewing the messages and selecting an operator override sequence. The method then proceeds to 510.

At 510, it is determined whether any remaining messages need to be sequenced. If messages remain, the method returns to 504. Otherwise, the method proceeds to 512 where sequencing of messages continues, such as response sequencing, resource sequencing, or event sequencing.

In operation, method 500 allows messages to be sequenced based upon available bandwidth so as to optimize message distribution in an enterprise software distribution system. Method 500 allows priority to be assigned to messages so as to ensure that messages are received in a predetermined order, such as messages that may require a response to be generated or other suitable messages.

Figure 6:
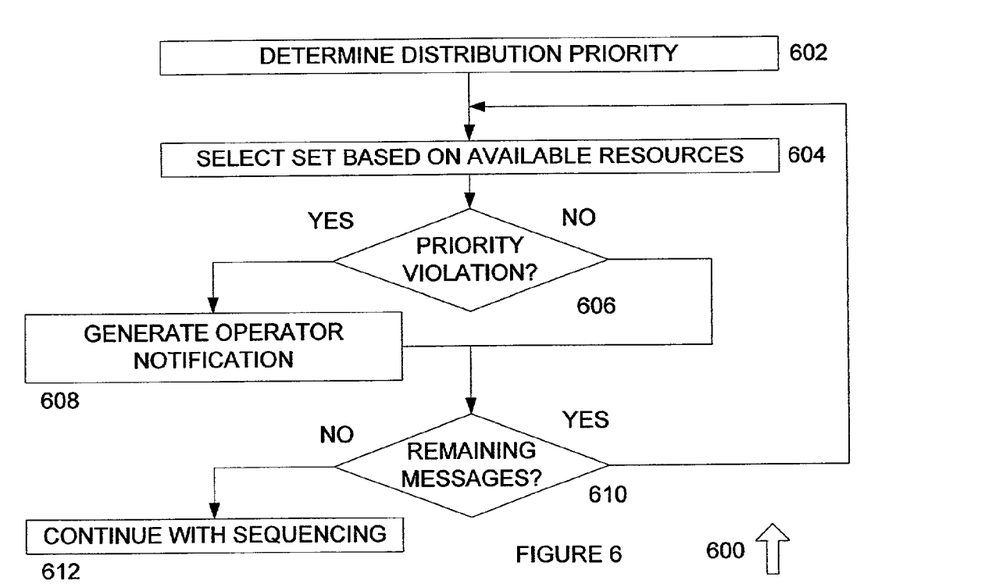
FIG. 6 is a flowchart of a method for performing resource sequencing of messages in accordance with an exemplary embodiment of the present invention.

FIG. 6 is a flowchart of a method 600 for performing resource sequencing of messages in accordance with an exemplary embodiment of the present invention. Method 600 allows a plurality of messages to be sequenced based upon resource requirements in an enterprise software distribution system.

Method 600 begins at 602 where distribution priority is determined. The method then proceeds to 604, where a message set is selected based upon the available resources. In one exemplary embodiment, the message set can be selected based on processor requirements for processing the message, for generating responses, for processing responses, for operating timers, for storing files, processor capacity bottlenecks at certain locations, or other suitable resource sequencing functions. The method then proceeds to 606.

At 606, it is determined whether a priority violation has occurred. If a priority violation has not occurred, the method proceeds to 610. Otherwise the method proceeds to 608 where operator notification is generated. The method then proceeds to 610.

At 610, it is determined whether any remaining messages need to be sequenced. If messages remain, the method returns to 604. Otherwise, the method proceeds to 612 where sequencing of messages continues, such as response sequencing, bandwidth sequencing, event sequencing, or other suitable sequencing.

In operation, method 600 allows messages to be sequenced based upon available resources so as to optimize message distribution in an enterprise software distribution system. Method 600 allows priority to be assigned to messages so as to ensure that messages are received in a predetermined order, such as messages that may require a response to be generated or other suitable messages.

Figure 7:
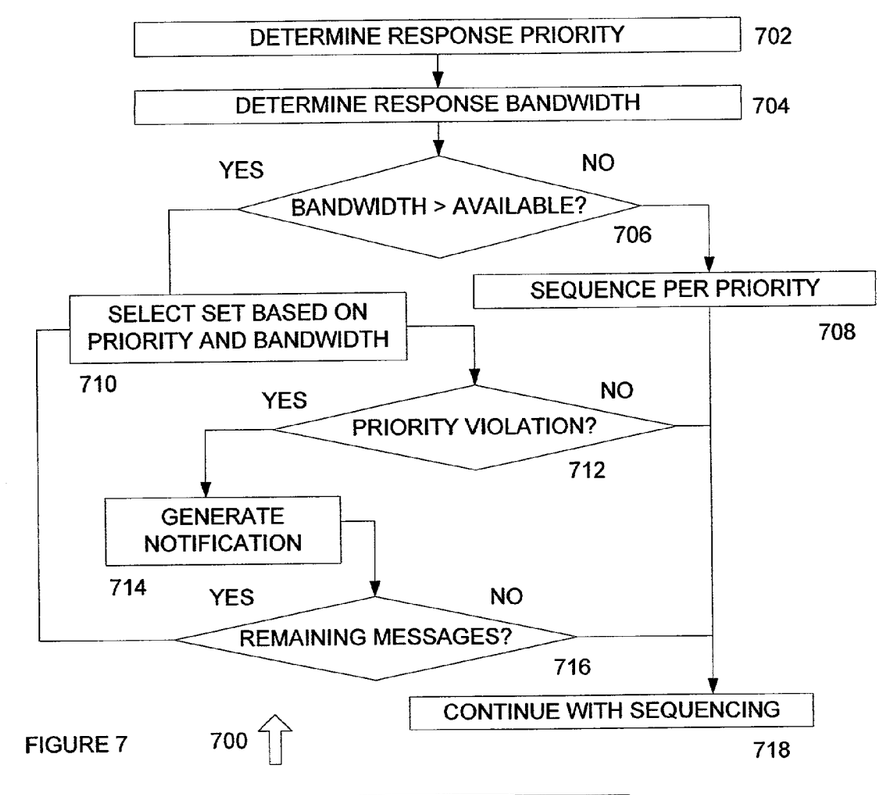
FIG. 7 is a flowchart of a method for performing response sequencing of messages in accordance with an exemplary embodiment of the present invention.

FIG. 7 is a flowchart of a method 700 for performing response sequencing of messages in accordance with an exemplary embodiment of the present invention. Method 700 allows a plurality of messages in an enterprise software distribution system to be sequenced based upon responses that may be generated after the distribution of messages to an endpoint.

Method 700 begins at 702 where a response priority is determined. In one exemplary embodiment, a response priority may be based upon control commands such as execution of an Intel WakeOnLAN Network Interface Card so that a processor is turned on prior to the transmission of messages to that processor. In this exemplary embodiment, the priority of the WakeOnLAN command would be greater than the priority for any other message. After the response priority is determined the method proceeds to 704.

At 704, response bandwidth is determined. In one exemplary embodiment, response bandwidth can include the available bandwidth between a plurality of endpoints and an application layer gateway, such as where the gateway is used to coordinate the transmission of response messages from the endpoints back to an application, such as an application distribution system 102. After the response bandwidth is determined, the method proceeds to 706.

At 706, it is determined whether the bandwidth required for the response is greater than available bandwidth. In one exemplary embodiment, the bandwidth can be determined based upon maximum response bandwidth required, the response bandwidth required at system bottlenecks, or other suitable bandwidth. If it is determined that the bandwidth is not greater than available, the method then proceeds to 708, where the messages are sequenced in accordance with the message priority. Otherwise, the method proceeds to 710.

At 710, a set of messages is selected based upon priority and bandwidth constraints. In one exemplary embodiment, bandwidth sequencing may have already been performed such that predetermined sets are available for response priority sequencing. In another exemplary embodiment, priority sequencing can be performed in conjunction with bandwidth sequencing, and the transmission sets can be selected based upon overlapping compatible sets. The method then proceeds to 712.

At 712, it is determined whether a priority violation has occurred. If a priority violation has not occurred, the method proceeds to 718. Otherwise, the method proceeds to 714 where a notification is generated requesting operator assistance. The method then proceeds to 716.

At 716, it is determined whether any remaining messages need to be sequenced. If remaining messages are available, the method returns to 710. Otherwise, the method proceeds to 718 where sequencing for other factors is performed, such as resource sequencing or event sequencing.

In operation, method 700 is used to perform response sequencing in an enterprise software distribution system, so as to prevent responses that may be generated following transmission of messages including files or control data from overloading system capacity. In this manner, system 700 prevents data loss from occurring, such as from undelivered messages, which can result in improper installation of files in an enterprise software distribution system.

Figure 8:
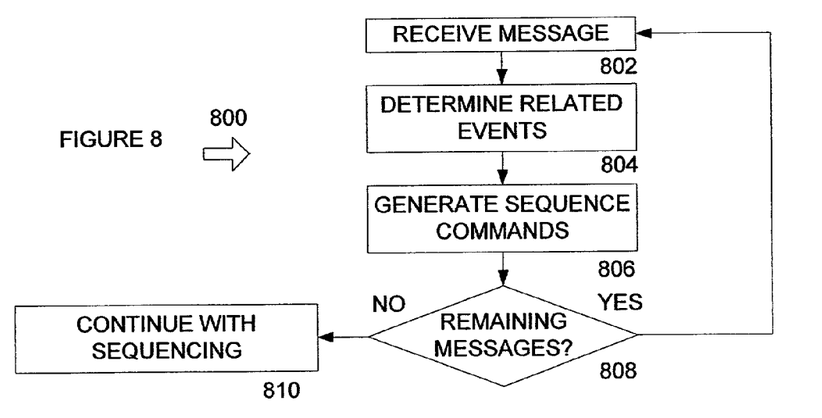
FIG. 8 is a flowchart of a method for performing event based sequencing of messages for an enterprise software distribution system in accordance with an exemplary embodiment of the present invention.

FIG. 8 is a flowchart of a method 800 for performing event based sequencing of messages for an enterprise software distribution system in accordance with an exemplary embodiment of the present invention. Method 800 begins at 802 where a message is received. In one exemplary embodiment, the message can include file data, control data or other suitable data that identifies a message transmission route, a message transmission endpoint, functional requirements, or other suitable data. The method then proceeds to 804.

At 804, it is determined whether there are any related events required for the message. In one exemplary embodiment, installation of components, bandwidth availability, processor availability, or other suitable events may need to occur before a message is transmitted, such as to prevent inadvertent non-delivery of the message, to ensure that predetermined events occur prior to transmission of the message, or for other suitable purposes. The method then proceeds to 806.

At 806, sequence commands are generated. In one exemplary embodiment, message sequencing can be generated based upon relative events, such that messages are sequenced after all messages have been processed. In another exemplary embodiment, messages can be assigned a sequence based upon absolute events, such as transmission of a message after a processor is on, transmission of a message after an operating system has been installed, or other suitable events. The method then proceeds to 808.

At 808, it is determined whether remaining messages need to be sequenced for event related sequencing. If any messages are remaining, the method returns to 802. Otherwise, the method proceeds to 810 where the process continues with any remaining sequencing, such as bandwidth sequencing, response sequencing, or resource sequencing.

In operation, method 800 allows messages to be sequenced based upon events that may be required prior to transmission of a message. Method 800 thus allows modified publish and subscribe messaging to be used in an enterprise software distribution system so as to allow the address of an endpoint to be determined centrally and for the message to be sequenced to the endpoint without inadvertent receipt of a message prior to predetermined events.

Figure 9:
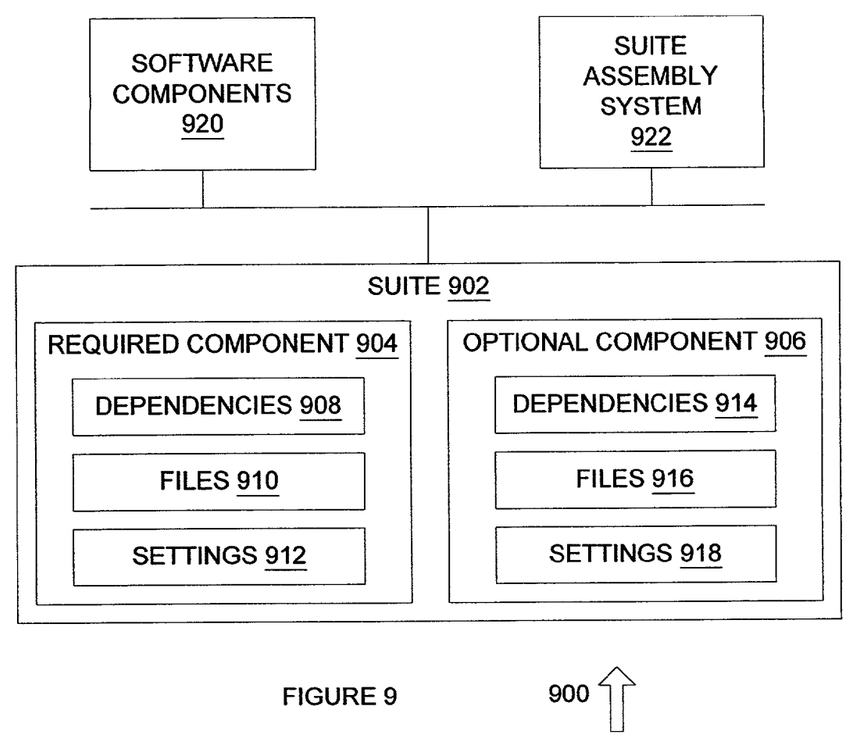
FIG. 9 is a diagram of a system for assembling software suites in accordance with an exemplary embodiment of the present invention.

FIG. 9 is a diagram of a system 900 for assembling software suites in accordance with an exemplary embodiment of the present invention. System 900 is used to assemble suites of software comprising one or more components in a manner that allows conflicting dependencies, files, and registry settings of the components to be coordinated and for conflicts to be resolved.

System 900 includes software components 920, suite assembly system 922, and suite 902. Suite assembly system 922 converts two or more software applications from software components 920 into one or more required components 904 or optional components 906 of suite 902. Suite assembly system 922 can be implemented in hardware, software, or a suitable combination of hardware and software, and can be one or more software systems operating on a general purpose server platform. Suite assembly system 922 is used to assemble two or more software components into a software suite. In one exemplary embodiment, suite assembly system 922 allows software components to be configured for operation on a processor independently, and then analyzes each software component to identify dependencies, files, and settings that are used to determine whether the combination of the software component with other software components into a software suite would create conflicts requiring resolution. Furthermore, suite assembly system 922 can implement existing rules for resolution of conflicts, can notify an operator of conflicts and allow the operator to take corrective actions, or can perform other suitable functions.

Each required component 904 includes one or more dependencies 908 (which can include hardware or software that are used by the required component 904), files 910 (which can include one or more of the files that are a part of required component 904 or generated by required component 904 or used by required component 904 for operation), one or more settings 912 (which can include registry settings in one or more registries of the operating system or other related software applications), and other suitable features.

Likewise, optional component 906 includes dependencies 914, files 916, and settings 918. The software applications of suite 902 are organized into required components 904 and optional components 906 so as to facilitate the identification of conflicts between the dependencies 908 and dependencies 914, files 910 and files 916, and settings 912 and settings 918. In this manner, conflicts can be identified between the dependencies, files, and settings before a component is combined with another component. For example, a list of dependencies for a first component can be compared to the list of dependencies for a second component, and any conflicts can be identified, such as dependencies on hardware or software that require different types of hardware, different versions of software, or other dependencies. In this manner, the components can be analyzed to determine whether it is possible to obtain a later version of the components having correct hardware or software dependencies, whether the hardware or software dependencies can be analyzed to determine whether they are compatible, or whether other suitable rules or corrections can be implemented.

Likewise, files 910 or files 916 for two components (such as two required components 904, two optional components 906, or a required component 904 and an optional component 906) can be compared to determine whether the files required by one component conflict with the files required by the second component, such as where versions of files are different, file names are identical but functions are different, or other conflicts exist. In this manner, rules or fixes to the problem can be determined, such as by renaming files, modifying the components to make file versions compatible, or other suitable rules or corrections.

Likewise, the settings for two components can also be compared to determine whether any setting conflicts exists. If a setting conflict is determined to exist, then a rule or correction or code modification can be implemented to correct the setting conflict.

Furthermore, when a conflict exists between a required component and an optional component, the optional component can be overridden in favor of the required component, such as by changing the dependency, file, or setting requirement of the optional component to match that of the required component, disabling the optional component until a new version of the optional component can be obtained from the provider that resolves the conflict, or other suitable functions. Thus, arrangement of suite 902 into one or more required component 904 and one or more optional component 906 allows further flexibility in resolving conflicts between components prior to installation of such components in an operating environment.

In operation, system 900 allows software installation in an enterprise setting to be performed in a manner that eliminates the potential for conflicts to occur when suites of software are installed on a processor. System 900 allows software suites to be assembled in advance from separate components in a manner that identifies conflicts between hardware and software dependencies, files, settings, or other features of the software. In this manner, conflicts between such dependencies, files, and settings, can be resolved prior to the time when the software suite is deployed. Likewise, system 900 allows optional component dependencies, files, and settings, to be overridden in favor of required component dependencies, files, and settings when conflicts exist between such and required optional components.

Figure 10:
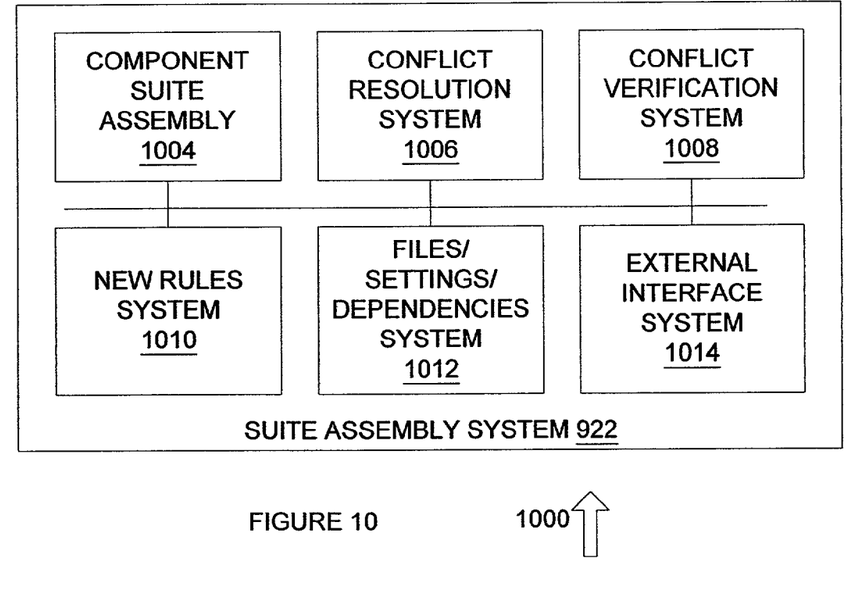
FIG. 10 is a diagram of a system for identifying and resolving conflicts between components in a software suite in accordance with an exemplary embodiment of the present invention.

FIG. 10 is a diagram of a system 1000 for identifying and resolving conflicts between components in a software suite in accordance with an exemplary embodiment of the present invention. System 1000 allows conflicts between software suites to be identified, and for such conflicts to be resolved or brought to the attention of an operator prior to distribution of the software suite in an enterprise environment.

System 1000 includes suite assembly system 922 and component suite assembly 1004, conflict resolution system 1006, conflict verification system 1008, new rule system 1010, files/settings/dependencies system 1012, and external interface system 1014, each of which can be implemented in hardware, software, or a suitable combination of hardware and software, and which can be one or more software systems operating on a general purpose server platform.

Component suite assembly 1004 takes two or more software components and assembles them into a software suite. In one exemplary embodiment, component suite assembly 1004 can implement existing rules for resolution of conflicts, can receive operator entered rules or instructions for resolution of conflicts, or can perform other suitable functions to resolve conflicts. Component suite assembly 1004 then assembles the components into suites for installation in an enterprise software distribution system, such as by ordering the software components in a directory based order, an installation sequence based order, or other suitable assemblies.

Conflict resolution system 1006 receives conflict identification data from component suite assembly 1004 and performs conflict resolution processes to resolve the conflicts. In one exemplary embodiment, conflict resolution system 1006 can implement existing rules for correcting conflicts between files, settings, dependencies, or other software system features. Likewise, conflict resolution system 1006 can receive operator-entered directions for resolution of conflicts as a function of enterprise, applications within enterprise, workstation functions, or other suitable features, and can store such directions as rules for subsequent conflict resolution.

Conflict verification system 1008 performs verification of component conflicts. In one exemplary embodiment, conflict verification system 1008 can analyze files, settings, and dependencies and determine whether an actual conflict between such files, settings, and dependencies exists. In this embodiment, conflicting files can be compared to determine whether the content of the files is identical. Likewise, settings and dependencies can also be compared to determine whether actual conflicts exists. Conflict verification system 1008 can generate conflict verification data that identifies whether conflicts can be resolved by files/settings/dependencies system 1012, new rule system 1010, external interface system 1014, or other suitable systems or functions.

New rule system 1010 allows an operator to generate new rules for resolution of conflicts between components and a software suit. In one exemplary embodiment, a rule can be used to resolve conflicts where the conflict can be corrected by overriding an optional component in favor of a required component, where the conflict can be resolved by disabling a component in a manner that does not affect the component's application in the enterprise, by editing a file, setting or dependency, or by otherwise creating an external rule. In this manner, new rule system 1010 allows new rules to be created and implemented through conflict resolution system 1006 so as to reduce the amount of operator involvement required to resolve conflicts.

Files/settings/dependencies system 1012 resolves conflicts between files, settings, and dependencies of two or more components. In one exemplary embodiment, conflict resolution system 1006 can determine that resolution of a conflict between two components in a software suite can be performed by addressing the files, settings, or dependencies of the components, such as where conflict verification system 1008 determines that the two different versions of a file perform the same function or contain the same matter, that hardware or software settings can be corrected, that dependencies can be corrected, or that other suitable fixes can be made.

External interface system 1014 performs tracking and verification of requests to external organizations for resolving conflicts between components, such as software system providers. In one exemplary embodiment, a conflict between components may be caused through a conflict in files, settings, or dependencies that cannot be resolved by overriding the files, settings, or dependencies of an optional component with those of a required component, by disabling functions of a component, or by otherwise generating rules for resolution of conflicts. In this exemplary embodiment, the resolution of the problem may require modification of source code that is unavailable, the addition of new functionality to source code, or other functions that cannot be performed by an operator. External interface system 1014 allows such problems to be tracked, and performs management of the request to one or more external software development organizations.

In operation, system 1000 allows components to be assembled into software suites in a manner that identifies and corrects conflicts between files, settings, dependencies, and which also allows for operator intervention where necessary to resolve conflicts. System 1000 thus allows resolution of conflicts between components to be automated, to the extent that operator intervention is not required. Likewise, system 1000 allows tracking of component fixes that require the involvement of third parties.

Figure 11:
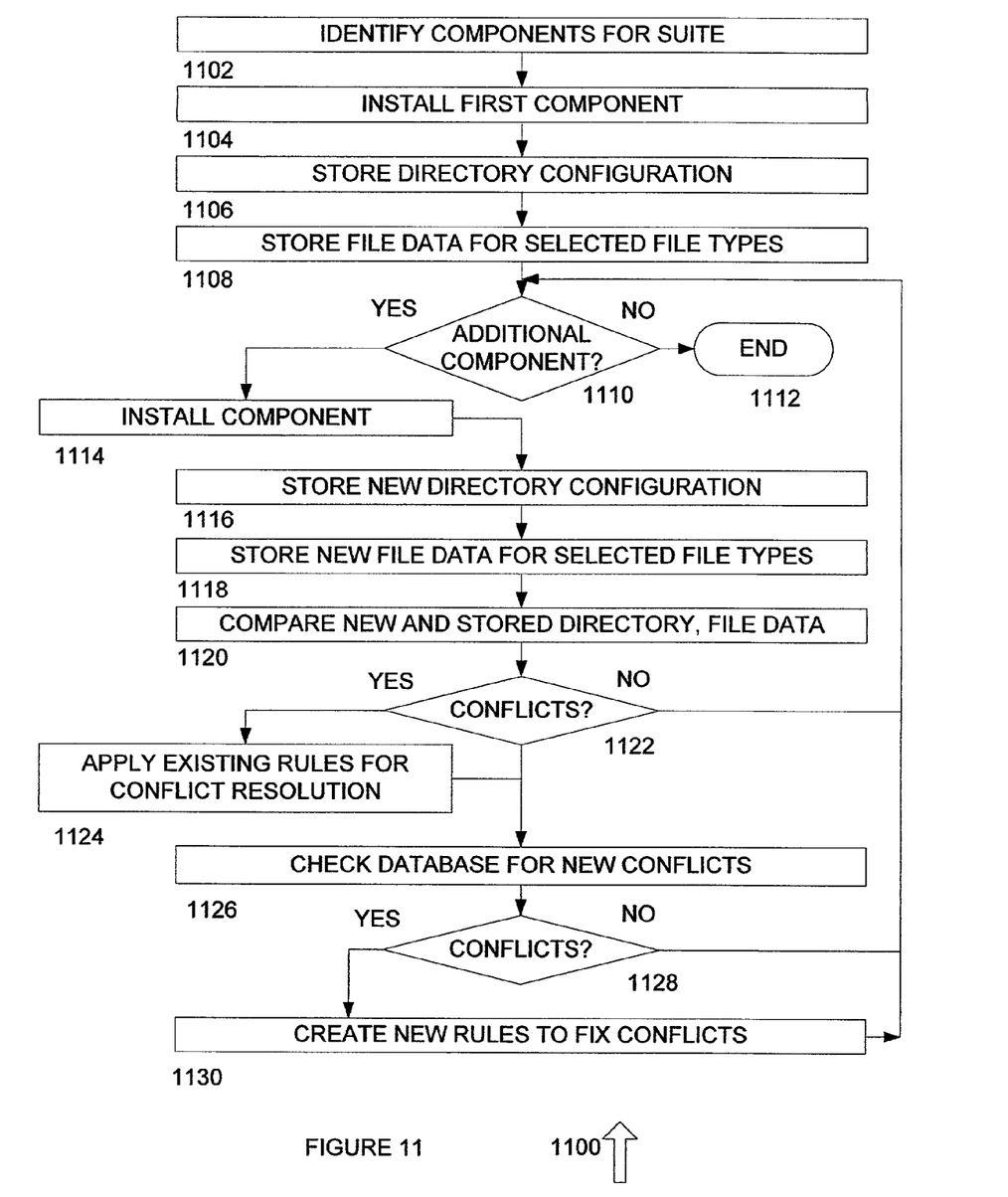
FIG. 11 is a flowchart of a method for assembling components into a software suite in accordance with an exemplary embodiment of the present invention.

FIG. 11 is a flowchart of a method 1100 for assembling components into a software suite in accordance with an exemplary embodiment of the present invention. Method 1100 begins at 1102 where the components for the suite are identified. In one exemplary embodiment, a software suite can include two or more components that operate in conjunction with each other to provide added functionality, such as a web browser and an email program that allow a user to seamlessly send emails to addresses identified through the web browser, to seamlessly go to web pages for which a URL is identified in an email, or other suitable functions. Likewise, accounting components, word processing components, spreadsheet components, travel planning components, order processing components, communications components, design components, testing components, form generation components, or other suitable groups of components can be assembled into a suite. The method then proceeds to 1104.

At 1104, the first component is installed. In one exemplary embodiment, the component can be installed on a platform having the software and hardware configuration of platforms within the enterprise that will be operating the same component. Likewise, the hardware and software configurations can be simulated and the component can be installed in an operating environment for assembling software components. The method then proceeds to 1106.

At 1106, directory configuration data is stored. In one exemplary embodiment, the names, creation dates, version numbers, sizes, and other information or files can be stored for subsequent comparison with other components. The method then proceeds to 1108.

At 1108, file data for selected types is stored. In one exemplary embodiment, the selected file types can include Dynamic Link Library (*.DLL) flies, executable (*.EXE) file headers, and other suitable files that will control the generatation of files, settings, or dependency settings for the various software components. The method then proceeds to 1110.

At 1110, it is determined whether any additional components remain. If no additional components remain, the method proceeds to 1112 and terminates. Otherwise, the method proceeds to 1114 where the next component is installed. The method then proceeds to 1116 where a directory configuration is stored for the new component. At 1118, file data is stored for the selected file types of the new component and the method proceeds to 1120.

At 1120, the new and stored directory and file data is compared to determine whether there are any conflicts. In one exemplary embodiment, the directory and file data can be stored for each previously processed component, such that conflicts between individual components can be identified. In this manner, the addition of a new component that conflicts with only one of several existing components can be identified, so as to determine whether a rule should be implemented or whether modification of a file, setting, or dependency can be implemented to resolve the conflict. The method then proceeds to 1122.

At 1122, it is determined whether any conflicts exist. If no conflicts exist, the method returns to 1110. Likewise, if conflicts are determined to exist, the method proceeds to 1124. At 1124, existing rules for conflict resolution are applied, such as from previous software suite configurations, software suite configurations for previous versions of the components, or other suitable rules. The method then proceeds to 1126.

At 1126, the database is checked for new conflicts. In one exemplary embodiment, the directory configuration and file data for selected file types can be checked to determine whether a conflict exists. If no conflict exists, the method returns to 1110. Otherwise, if it is determined that a conflict exists, the method proceeds to 1130, where new rules are created to resolve the conflicts. In one exemplary embodiment, the generation or creation of new rules can include contacting a third party to modify one or more software components to resolve the conflict. The method then returns to 1110.

In operation, method 1100 allows two or more components to be assembled into a software suite in a manner that allows conflicts between components to be identified and corrected prior to distribution of the component in an enterprise environment. Method 1100 thus allows such conflicts to be identified before enterprise-wide distribution of a software suite.

Figure 12:
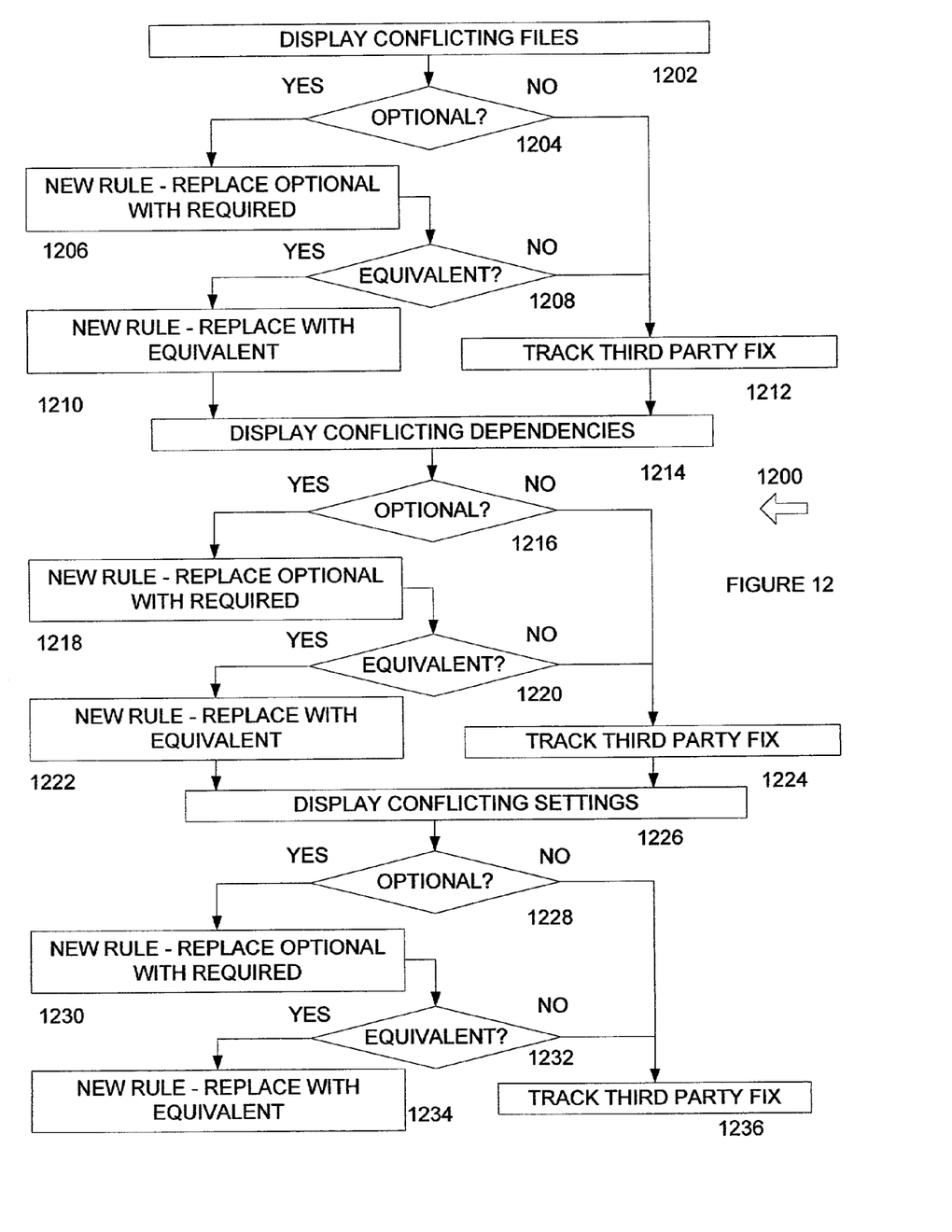
FIG. 12 is a flowchart of a method for resolving conflicts between software components in accordance with an exemplary embodiment of the present invention.

FIG. 12 is a flowchart of a method 1200 for resolving conflicts between software components in accordance with an exemplary embodiment of the present invention. Method 1200 allows rules to be created and implemented, and files, settings and dependencies to be modified in order to resolve conflicts.

Method 1200 begins at 1202 where conflicting files are displayed. In one exemplary embodiment, the conflicting files can be displayed on a user interface for operator review, the conflicting files can be stored in a file for use by a software application, or other suitable processes can be used. The method then proceeds to 1204.

At 1204, it is determined whether any of the files belong to optional components. If none of the files belong to optional components, the method proceeds to 1212. Otherwise, the method proceeds to 1206, where a new rule is generated to replace the optional file with the required file. Likewise, some files may require a rule to replace the file only for predetermined components, while others may allow replacement of the file for all components. The method then proceeds to 1208.

At 1208, it is determined whether the optional file is equivalent to the required file, such as in operation, configuration or in other suitable manners. If it is determined at 1208 that the optional file is not equivalent to the required file, the method proceeds to 1212 where a third party fix is tracked. In this exemplary embodiment, generation of the new rule does not resolve the conflict and a third party fix is necessary to eliminate the conflict between the files. The method then proceeds to 1214. If it is determined at 1208 that the files are equivalent, the method proceeds to 1210 where the new rule to replace the optional file with the required file is generated and implemented or stored for further implementation. Likewise, some files may require a rule to replace the file only for predetermined components, while others may allow replacement of the file for all components. The method then proceeds to 1214.

At 1214, conflicting dependencies are displayed. In one exemplary embodiment, the conflicting dependencies can be displayed on a user interface for operator review, the conflicting dependencies can be stored in a file for use by a software application, or other suitable processes can be used. The method then proceeds to 1216.

At 1216, it is determined whether any of the dependencies are related to optional components. If none of the dependencies are related to optional components, the method proceeds to 1224. Otherwise, the method proceeds to 1218, where a new rule is generated to replace the optional dependencies with the required dependencies. Likewise, some dependencies may require a rule to replace the dependencies only for predetermined components, while others may allow replacement of the dependencies for all components. The method then proceeds to 1220.

At 1220, it is determined whether the optional dependencies are equivalent to the required dependencies, such as in operation, configuration or in other suitable manners. If it is determined at 1220 that the optional dependencies are not equivalent to the required dependencies, the method proceeds to 1224 where a third party fix is tracked. The method then proceeds to 1226. If it is determined at 1220 that the dependencies are equivalent, the method proceeds to 1222 where the new rule to replace the optional dependency with the required dependency is generated and implemented or stored for further implementation. Likewise, some dependencies may require a rule, while others may allow replacement. The method then proceeds to 1228.

At 1226, conflicting settings are displayed. In one exemplary embodiment, the conflicting settings can be displayed on a user interface for operator review, the conflicting settings can be stored in a file for use by a software application, or other suitable processes can be used. The method then proceeds to 1228.

At 1228, it is determined whether any of the settings are related to optional components. If none of the settings are related to optional components, the method proceeds to 1236. Otherwise, the method proceeds to 1230, where a new rule is generated to replace the optional settings with the required settings. Likewise, some settings may require a rule to replace the settings only for predetermined components, while others may allow replacement of the settings for all components. The method then proceeds to 1232.

At 1232, it is determined whether the optional settings are equivalent to the required settings, such as in operation, configuration or in other suitable manners. If it is determined at 1232 that the optional settings are not equivalent to the required settings, the method proceeds to 1236 where a third party fix is tracked. If it is determined at 1232 that the settings are equivalent, the method proceeds to 1234 where the new rule to replace the optional setting with the required setting is generated and implemented or stored for further implementation. Likewise, some settings may require a rule, while others may allow replacement.

In operation, method 1200 allows two or more software components to be analyzed to determine whether conflicts exist, and to resolve the conflicts, to generate new rules, to request third party fixes, or to otherwise resolve the conflict.

Although exemplary embodiments of a system and method for performing the present invention have been described in detail herein, those skilled in the art will also recognize that various substitutions and modifications can be made to the systems and methods without departing from the scope and spirit of the appended claims.

What is claimed is:

1. A computer implemented method for distributing software comprising:
    configuring a first software system of a software suite;
    storing a first set of configuration data associated with the first software system;
    configuring a second software system of the software suite;
    storing a second set of configuration data associated with the second software system;
    applying conflict resolution rules to the first set of configuration data and the second set of configuration data;
    determining whether a conflict exists by comparing the first set of configuration data and the second set of configuration data;
    creating a new conflict resolution rule if it is determined that a conflict exists;
    applying the new conflict resolution rule to the first set of configuration data and the second set of configuration data; and
    assembling the first set of configuration data and the second set of configuration data for installation on one or more remote processors.

2. The method of claim 1 wherein determining whether any additional conflicts exists by comparing the first set of configuration data and the second set of configuration data includes one or more of a set comprising determining whether one or more of a group comprising a hardware dependency conflict, a software dependency conflict, a file conflict, and a settings conflict exists.

3. The method of claim 1 wherein the first set of configuration data includes one or more of a set comprising file directory data, registry setting data, hardware dependency data, dynamic link library file data, executable file data, and software dependency data.

4. The method of claim 1 further comprising:
    determining whether the conflict is between configuration data for a required software system and configuration data for an optional software system; and
    resolving the conflict by replacing the configuration data for the optional software system with the configuration data for the required software system.

5. The method of claim 4 wherein resolving the conflict by replacing the configuration data for the optional software system with the configuration data for the required software system further comprises replacing one or more of a group comprising file directory data, registry setting data, hardware dependency data, dynamic link library file data, executable file data, or software dependency data for the optional software system with corresponding file directory data, registry setting data, hardware dependency data, dynamic link library file data, executable file data, or software dependency data of the required software system.

6. The method of claim 1 further comprising:
    determining whether the conflict between the first set of configuration data and the second set of configuration data requires third party action; and
    tracking a status of the third party action.

7. The method of claim 1 further comprising:
    identifying a conflict between the first set of configuration data and the second set of configuration data;
    notifying a third party of the identified conflict; and
    receiving a rule for addressing the identified conflict from the third party.

8. A computer implemented system for distribution comprising:
    two or more software components configured for installation;
    a suite assembly system receiving the two or more software components and generating a software suite for installation on at least one remote device comprising at least:
    a first installation component comprising one or more of a first group comprising first dependencies, first files and first settings; and
    a second installation component comprising one or more of a second group comprising second dependencies, second files and second settings; and
    wherein the first dependencies and second dependencies include no conflicting dependencies, the first files and the second files include no conflicting files, and the first settings and the second settings include no conflicting settings;
    the suite assembly system comprises a conflict verification system determining whether any conflicts exist between the first dependencies and the second dependencies, the first files and the second files, and the first settings and the second settings;
    the suite assembly system further comprises a new rules system generating one or more new conflict resolution rules if its is determined that a conflict exists; and
    the one or more new conflict resolution rules are applied to the first installation component and the second installation component.

9. The system of claim 8 wherein the suite assembly system further comprises a component suite assembly configuring the first installation component and the second installation component for distribution.

10. The system of claim 8 wherein the suite assembly system further comprises a conflict resolution system resolving conflicts between the first dependencies and the second dependencies, the first files and the second files, and the first settings and the second settings.

11. The system of claim 8 wherein the suite assembly system further comprises a files/settings/dependencies system resolving conflicts between two or more sets of one or more of the group comprising files, settings, and dependencies.

12. The system of claim 8 wherein the suite assembly system further comprises an external system interface tracking a component correction by a third party.

13. The system of claim 8 wherein the first installation component is one of a required component or an optional component.

14. The system of claim 8 wherein the suite assembly system further comprises an external system interface for notifying a third party of a conflict and receiving a rule for resolving the conflict.

* * * * *